Aug. 21, 1951   G. SLAVICEK   2,564,930
BLOWER PIPE ACCESS DOOR
Filed July 20, 1948   2 Sheets-Sheet 1
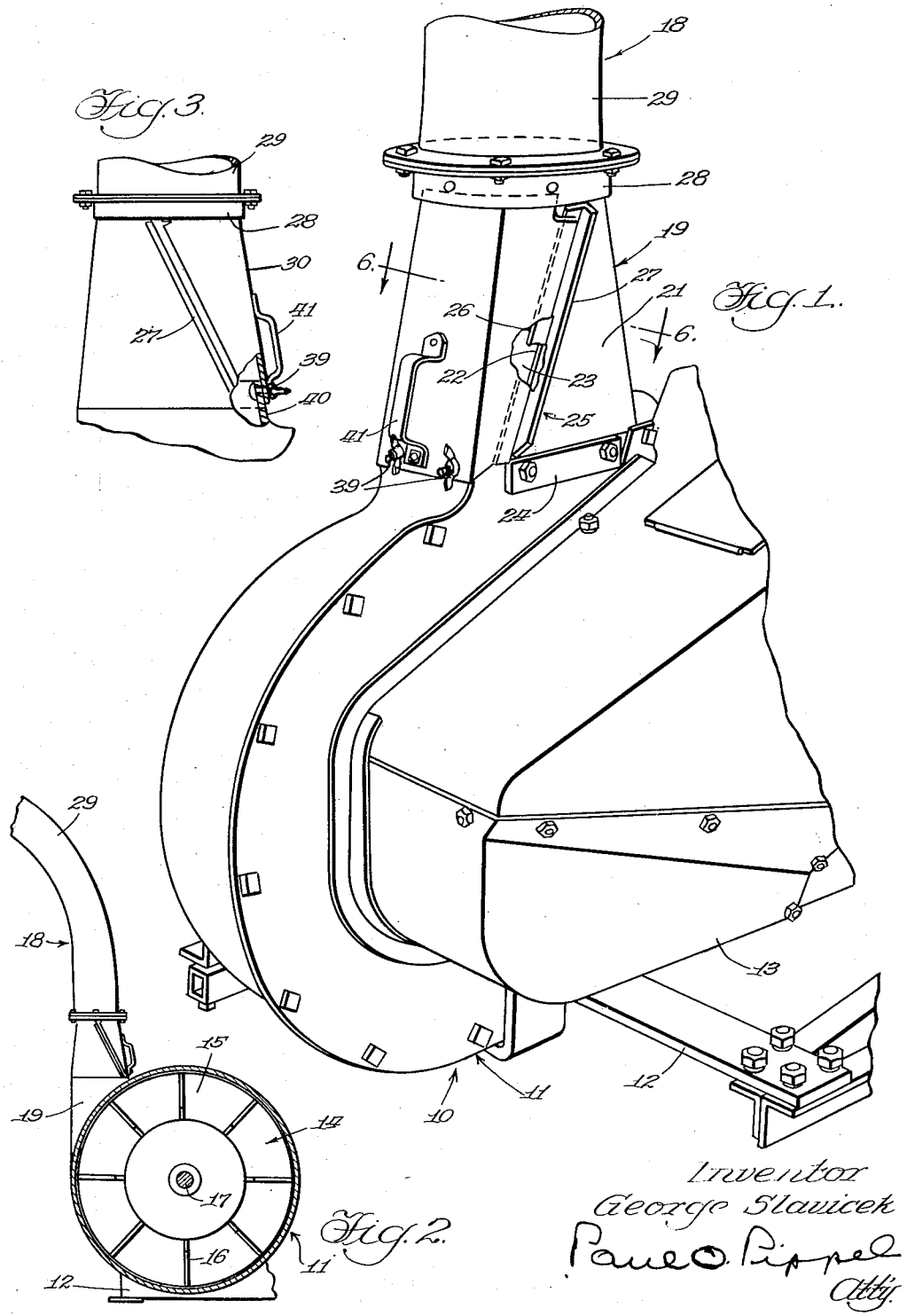
Inventor
George Slavicek
Paul O. Pippel
Atty.

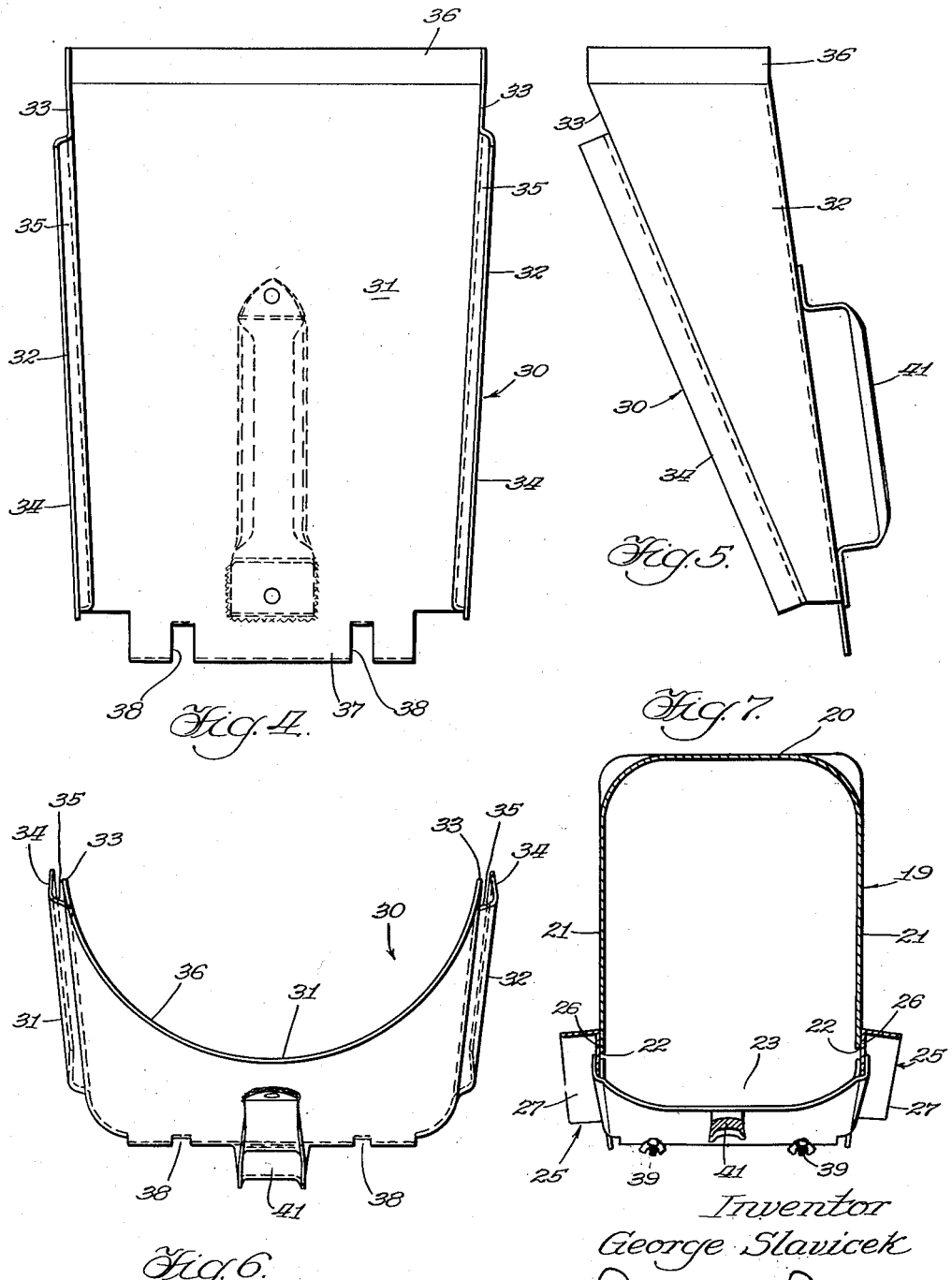

Patented Aug. 21, 1951

2,564,930

UNITED STATES PATENT OFFICE 2,564,930

BLOWER PIPE ACCESS DOOR

George Slavicek, Oak Park, Ill., assignor to International Harvester Company, a corporation of New Jersey Application July 20, 1948, Serial No. 39,760

6 Claims. (Cl. 302—37)

This invention relates to a crop distributing apparatus utilized in connection with a crop gathering device. More specifically, this invention relates to a novel and improved distributing and discharging conduit for the blower of a crop distributing apparatus.

In ensilage harvesters and other similar crop gathering and treating implements it is customary to provide a crop distributing apparatus for discharging the material treated. The apparatus generally consists of a cylindrical housing which is in communication with a material delivery chute for receiving the crops from the crop gathering device and supplying the same to the crop distributing apparatus. The housing is generally provided with a rotary fan or blower. A discharge portion and conduit is connected tangentially to the housing and extends upwardly with respect thereto. A distributor is connected to the upper end of the conduit and discharges the material to the silo or other receiving means. The type of crop discharging apparatus with which the present invention is concerned is adequately disclosed in the patent to G. M. Merwin, Re. 15,050, dated February 22, 1921.

During high speed rotation of the fan, the material is blown by the blast developed upwardly through the discharge conduit. In general the performance of the blowers of discharging apparatus of this type has been satisfactory with the exception of periodic clogging or blocking of the material within the discharge portion of the conduit. The discharge portion is immediately tangent to and adjacent the blower housing. During the starting of the blower fan the velocity of the blast created is of course comparatively negligible. During the initial stage of operation, therefore, in many instances the material becomes lodged near the point of communication of the discharge portion with the housing. Subsequent high speed of operation of the fan is insufficient to break up the blockage created and it is therefore often necessary to completely disassemble the discharge portion and conduit from the housing so that the operator has access to the interior of the same for breaking up the blockage. This procedure, of course, is time consuming and costly and it is therefore applicant's prime object to provide an improved discharge and distributing conduit for the blower of a crop distributing apparatus.

Another object of importance is to provide an access door for the purpose of permitting ready access to a discharge conduit positioned immediately adjacent and tangent to the blower housing.

Another object is to provide a discharge conduit for a blower, said conduit including a removable access door through which the operator may have ready access to remove blockage of material within the conduit.

A still further object is to provide an access door for the tangentially disposed discharge portion of a blower, said door including a pair of diagonally extending sides having edge portions adapted to engage a pair of track members disposed adjacent an access opening provided in the discharge portion, the access door being readily removable from the opening, thereby providing ready access for an operator to inspect the interior of the conduit and remove any blockage of material occurring within the same.

These and other objects will become more clearly apparent from a reading of the specification when examined in conjunction with the drawings.

In the drawings:

Fig. 1 is a perspective view of the rear portion of a crop distributing apparatus.

Fig. 2 is a front elevational view of a crop distributing apparatus showing a portion of the blower housing in section to disclose a rotary fan therein.

Fig. 3 is a side elevational view of a portion of a discharge and distributing means.

Fig. 4 is a rear view in elevation of an access door or closure member.

Fig. 5 is a side elevational view of the same.

Fig. 6 is a plan view of the closure member.

Fig. 7 is a sectional view through a discharge portion, said view being taken substantially along the line 6—6 of Fig. 1.

Referring particularly to Figs. 1 and 2, a crop distributing apparatus is generally designated by the reference character 10. The crop distributing apparatus 10 includes a cylindrical sheet metal housing 11 carried by a supporting structure 12. The rear face of the housing 11 is connected to a supply chute 13, the supply chute 13 generally being connected to an ensilage cutter or other crop treating apparatus (not shown).

As best shown in Fig. 2, a blower or propelling fan 14 is positioned within the housing 11. The fan 14 includes a circular plate 15 having a plurality of radially extending fans or paddles 16. The fan 14 is rotated by means of a shaft 17.

As best shown in Figs. 1 and 2 a discharge and distributing means is generally designated by the reference character 18. The discharge means 18 includes a discharge portion 19. The discharge portion 19 is positioned tangentially with respect to the housing 11 and is in communication therewith. The discharge portion 19 as best shown in Figure 7, includes a back member 20 and side members 21. The side members 21 terminate in a pair of diagonally extending edges 22, said edges defining an access opening generally designated by the reference character 23. The discharge portion 19 is connected to the housing 11 by means of plate members 24 (only one of which is shown). The edges 22 of the discharge portion 19 are reinforced by means of angle members 25, said angle members including sides 26 and 27. The angle members 25 serve to stiffen the edges 22, and each of the sides 26 of the angle members serve as a track member for slidably supporting a closure member in a manner that will presently be described. The upper end of the discharge portion 19 is provided with an angular flanged collar 28. A discharge conduit 29 is connected to the collar 28, the discharge conduit extending upwardly and being of a conventional design for discharging and distributing material to an elevated receiving means.

A closure member or access door as best shown in Figures 4, 5 and 6 is generally designated by the reference character 30. The door 30 includes a back portion 31 and side portions 32. The side portions 32 are provided with diagonally extending edge portions 33. Each edge portion 33 also includes an L-shaped flange portion 34 having a diagonally extending shoulder 35. The upper end of the access door 30 is provided with an arcuate edge portion 36, and the lower end of the door 30 is provided with a downwardly extending tab 37. The tab 37 is provided with a pair of open end slots 38 which are adapted to be engaged by securing members in the form of screws and wing nuts 39. As best shown in Fig. 3 the securing members 39 extend through a neck portion 40 of the housing 11. A handle 41 is connected to the closure member 30.

As best shown in Fig. 1 the access door 30 is constructed to cover approximately one half of the cubic area of the discharge portion 19. When the access door 30 is removed the opening 23 exposes a sufficient area of the discharge portion 19 so that the operator may have quick access for dislodging any material that might have become lodged within the discharge portion. The arcuate edge portion 36 engages the inner edge of the flanged collar 28 in sliding relation and therefore is effective to hold the upper end of the closure member 30 in position on the discharge portion 19. The securing members 39 engage the open end slots 38 for securing the lower end of the closure member to the discharge portion. The shoulder 35 of each L-shaped flange portion 34 is coextensive with the side 26 of each angle 25. The shoulder 35 contacts this angle in sliding engagement and in order to remove the closure member 30 the operator merely grasps the handle 41, loosens up the wing nuts 39 and pushes the closure member 30 upwardly in sliding relation with respect to the angle 25. When the screws and wing nuts 39 are clear of the slots 38 the operator merely lifts out the access door 30 from the opening 23 and ready access to the discharge portion may be had. In order to again cover the access openings 23 the operator merely places the shoulder portions 35 of the closure member 30 into sliding engagement with the angle members 25, and slides the door upwardly on the angle members until the arcuate edge portion is in engagement with the collar 28. He then places the securing members 39 into engagement with the open end slots 38, tightens the nuts and the closure member is secured in place.

It can now be seen, therefore, that the operator has ready access to the discharge portion 19 by merely unloosening the securing members 39. By the novel construction disclosed access may be had to a wide area within the discharge portion 19 and material that is clogged therein may readily be removed. The angle members 25 serve to reinforce the edges 22 of the discharge portion and also serve as track members whereupon the access door 30 may be slid into position.

It must be understood that only a preferred embodiment of the invention has been disclosed and that changes may be made which do not depart from the spirit of the invention as disclosed nor the scope thereof as defined in the appended claims.

What is claimed is:

1. For a crop distributing apparatus having a cylindrical housing and a crop propelling member rotatable within said housing; a discharge means for distributing crops projected by said crop propelling member, said discharge means including a section connected in tangential relation with said housing, said section consisting of a back and two sides, the edges of the sides defining an access opening in said discharge portion, a collar connected to the upper end of said discharge section, a closure member for the opening, said closure member including back and side portions cooperating with the side and back portions of said section to provide an enclosed discharge portion, and quick detachable means for connecting said closure member to said section whereby the same may be readily removed for removal of material blockages therein including an edge portion of said closure member arranged to engage said collar to secure the upper end of said closure member to said section.

2. For a crop distributing apparatus having a rotatable crop propelling member, and a housing enclosing said crop propelling member; a discharge means for distributing crops delivered thereto by said crop propelling member, said discharge means including a discharge section connected tangentially to said housing, said discharge section including side walls each having a diagonally extending edge portion defining an opening in said discharge section, a collar connected to the upper end of said discharge section, a discharge conduit connected to said collar, a closure member for the opening, said closure member including back and side portions, each side portion having an L-shaped diagonal edge portion, said edge portions being arranged to engage the edge portions of said section in relative sliding relation and being coextensive therewith; and means for removably connecting said closure member to said discharge section to provide for ready access to said section including a slotted connection between the closure member and the housing and an edge portion of said closure member arranged to engage said collar whereby upon sliding movement of said closure member said member may be disconnected from said discharge section.

3. For a crop distributing apparatus having a rotatable crop propelling member, and a housing enclosing said crop propelling member; a discharge means for distributing crops delivered thereto by said crop propelling member, said discharge means including a discharge section connected tangentially to said housing, said discharge section including side walls each having a diagonally extending edge portion defining an opening in said discharge section, a collar connected to the upper end of said discharge section, a closure member for the opening, said closure member including back and side portions, each side portion having an L-shaped diagonal edge portion, said edge portions being arranged to engage the edge portions of said section in relative sliding relation and being coextensive therewith; and means for removably connecting said closure member to said discharge section to provide for ready access to said section including a slotted connection between the closure member and the housing and an edge portion of said closure member arranged to engage said collar whereby upon sliding movement of said closure member said member may be disconnected from said discharge section.

4. For a crop distributing apparatus having a rotatable crop propelling member, and a housing enclosing said crop propelling member; a discharge means for distributing crops delivered to said means by said crop propelling member, said discharge means including a discharge portion disposed in tangential relation to and in communication with said housing, a collar connected to the upper end of said discharge portion, a discharge conduit connected to said collar, said discharge portion including a section having an open side, transversely spaced upwardly extending track members connected to said section adjacent the open side, a closure member for said open side, said closure members including back and side portions, said side portions each having an L-shaped flange portion co-extensive with said track members, said flange portions being adapted to engage the track members in sliding relation, means for removably connecting said closure member to said discharge portion to provide for ready access to the same including an edge portion arranged to slidably engage said collar to secure the upper end of said closure member to said discharge portion, and connecting members on said housing engageable with said closure member.

5. For a crop distributing apparatus having a rotatable crop propelling member, and a housing enclosing said crop propelling member; a discharge means for distributing crops delivered to said means by said crop propelling member, said discharge means including a discharge portion disposed in tangential relation to and in communication with said housing, a collar connected to the upper end of said discharge portion, a discharge conduit connected to said collar, said discharge portion including a section having an open side, transversely spaced upwardly extending track members connected to said section adjacent the open side, a closure member for said open side, said closure members including back and side portions, said side portions each having a flange portion co-extensive with said track members, said flange portions being adapted to engage the track members in sliding relation, means for removably connecting said closure member to said discharge portion to provide for ready access to the same including a portion arranged to slidably engage said collar to secure the upper end of said closure member to said discharge portion, connecting members on said housing engageable with the closure member to secure the lower end of said closure member to said discharge portion; and a handle on said closure member, said handle being arranged whereby an operator can move the closure member upwardly in sliding relation with said track members thereby disconnecting said closure member from said discharge portion.

6. For a crop distributing apparatus having a rotatable crop propelling member, and a housing enclosing said crop propelling member; a discharge means for distributing crops delivered to said means by said crop propelling member, said discharge means including a discharge portion disposed in tangential relation to and in communication with said housing, a collar connected to the upper end of said discharge portion, a discharge conduit connected to said collar, said discharge portion including a section having an open side, transversely spaced upwardly extending track members connected to said section adjacent the open side, a closure member for said open side, said closure members including back and side portions, said side portions each having an L-shaped flange portion co-extensive with said track members, said flange portions being adapted to engage the track members in sliding relation, said closure members having a plurality of open end slots; means for removably connecting said closure member to said discharge portion to provide for ready access to the same including an upper edge portion arranged to slidably engage said collar to secure the upper end of said closure member to said discharge portion, connecting members on said housing engageable with the open end slots to secure the lower end of said closure member to said discharge portion; and a handle on said closure member, said handle being arranged whereby an operator can move the closure member upwardly in sliding relation with said track members thereby disengaging the connecting members from the open end slats to provide for removal of said closure member.

GEORGE SLAVICEK.

REFERENCES CITED

The following references are of record in the file of this patent:

UNITED STATES PATENTS

| Number | Name | Date |
|---|---|---|
| 613,668 | Dick | Nov. 8, 1898 |
| 1,850,545 | Gredell | Mar. 22, 1932 |
| 2,084,447 | Matejcik | June 22, 1937 |